(12) United States Patent
Davidson et al.

(10) Patent No.: US 11,059,239 B2
(45) Date of Patent: Jul. 13, 2021

(54) METHOD AND APPARATUS FOR COMPOSITE RIB AND RIB-AND-SHEET MOLDING

(71) Applicant: Arris Composites Inc., Berkeley, CA (US)

(72) Inventors: Erick Davidson, Piedmont, CA (US); Riley Reese, Oakland, CA (US); Ethan Escowitz, Berkeley, CA (US); J. Scott Perkins, Berkeley, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

(21) Appl. No.: 16/653,592

(22) Filed: Oct. 15, 2019

(65) Prior Publication Data

US 2020/0114591 A1 Apr. 16, 2020

Related U.S. Application Data

(60) Provisional application No. 62/745,686, filed on Oct. 15, 2018.

(51) Int. Cl.
*B29C 70/34* (2006.01)
*C08J 5/24* (2006.01)
(Continued)

(52) U.S. Cl.
CPC .......... *B29C 70/345* (2013.01); *B29C 43/021* (2013.01); *B29C 43/18* (2013.01);
(Continued)

(58) Field of Classification Search
CPC ................ B29C 43/021; B29C 43/146; B29C 2043/147; B29C 43/18; B29C 43/20;
(Continued)

(56) References Cited

U.S. PATENT DOCUMENTS

| 4,492,607 A * | 1/1985 | Halcomb ............... B29C 70/083 156/242 |
| 5,863,365 A * | 1/1999 | Bird .................... B29C 37/0064 156/245 |
| 2004/0265536 A1* | 12/2004 | Sana .................... B29C 70/541 428/119 |
| 2006/0172121 A1 | 8/2006 | Lee et al. |

(Continued)

FOREIGN PATENT DOCUMENTS

| DE | 102017107524 A1 | 10/2018 |
| GB | 2551842 A | 1/2018 |
| WO | 2018/162595 A1 | 9/2018 |

OTHER PUBLICATIONS

Authorized Officer Jeffrey Barrow, International Search Report dated Jan. 31, 2020 issued in PCT Patent Application No. PCT/US2019/056353.

*Primary Examiner* — Jeffrey M Wollschlager
(74) *Attorney, Agent, or Firm* — Kaplan Breyer Schwarz, LLP

(57) ABSTRACT

Rib-and-sheet structures include a rib comprising continuous, aligned fibers. The rib is fabricated via compression molding from continuous, aligned fiber, thereby providing an aligned, continuously reinforced rib. In one embodiment, rib-and-sheet structures are produced in a two-step compression-molding process, wherein a near net-shape rib is molded, in a first mold, from fiber-bundle based preforms, and then a rib-and-sheet part is molded by placing, in a second mold, the rib with either: (i) a preformed sheet, (ii) plies that form a laminate/sheet or (iii) chopped fibers that form a sheet during the molding process. In another embodiment, rib-and-sheet structures are fabricated in a one-step compression-molding process, wherein fiber-bundle-based preforms and (i) a preformed sheet, (ii) plies that form a laminate/sheet, or (iii) chopped fibers are combined in a single mold and molded in a single step.

21 Claims, 9 Drawing Sheets

(51) Int. Cl.
*B29C 43/02* (2006.01)
*B29C 43/18* (2006.01)
*B29K 101/12* (2006.01)

(52) U.S. Cl.
CPC .............. *C08J 5/24* (2013.01); *B29K 2101/12* (2013.01); *C08J 2363/00* (2013.01)

(58) Field of Classification Search
CPC ....... B29C 70/345; B29C 43/36; B29C 43/38; B29C 2043/3665; B29C 43/361; B29C 2043/189; B29C 2043/3255; B29C 2043/3602; B29C 43/32; B29C 70/081; B29C 70/12; B29C 70/20; B29C 70/46; B29C 70/84; B29C 33/306; B29C 33/14; C08J 5/24; C08J 2363/00; B29K 2101/12; B29K 2105/0872; B29K 2105/0881; B29K 2105/14; B29L 2031/3437; B29L 2007/002; B29D 99/0014; B29B 11/16
See application file for complete search history.

(56) References Cited

U.S. PATENT DOCUMENTS

| | | | |
|---|---|---|---|
| 2010/0239856 A1* | 9/2010 | Olson | B29C 70/465 428/339 |
| 2014/0196837 A1* | 7/2014 | Polewarczyk | B29C 65/002 156/196 |
| 2015/0017390 A1* | 1/2015 | Mine | B29C 59/026 428/156 |
| 2015/0151506 A1* | 6/2015 | Hawley | B32B 3/30 428/141 |
| 2016/0009054 A1* | 1/2016 | Okunaka | B32B 5/26 428/113 |
| 2016/0361839 A1* | 12/2016 | Backhaus | B29C 70/50 |
| 2018/0079111 A1* | 3/2018 | Gordin | B29C 70/081 |
| 2018/0272645 A1 | 9/2018 | Pavlov et al. | |
| 2018/0284845 A1* | 10/2018 | Honma | B29C 65/8215 |
| 2018/0345605 A1* | 12/2018 | Escowitz | B29C 70/345 |
| 2019/0091946 A1* | 3/2019 | Lancaster-Larocque | B29C 70/56 |
| 2019/0168420 A1* | 6/2019 | Reese | B29B 15/14 |

* cited by examiner

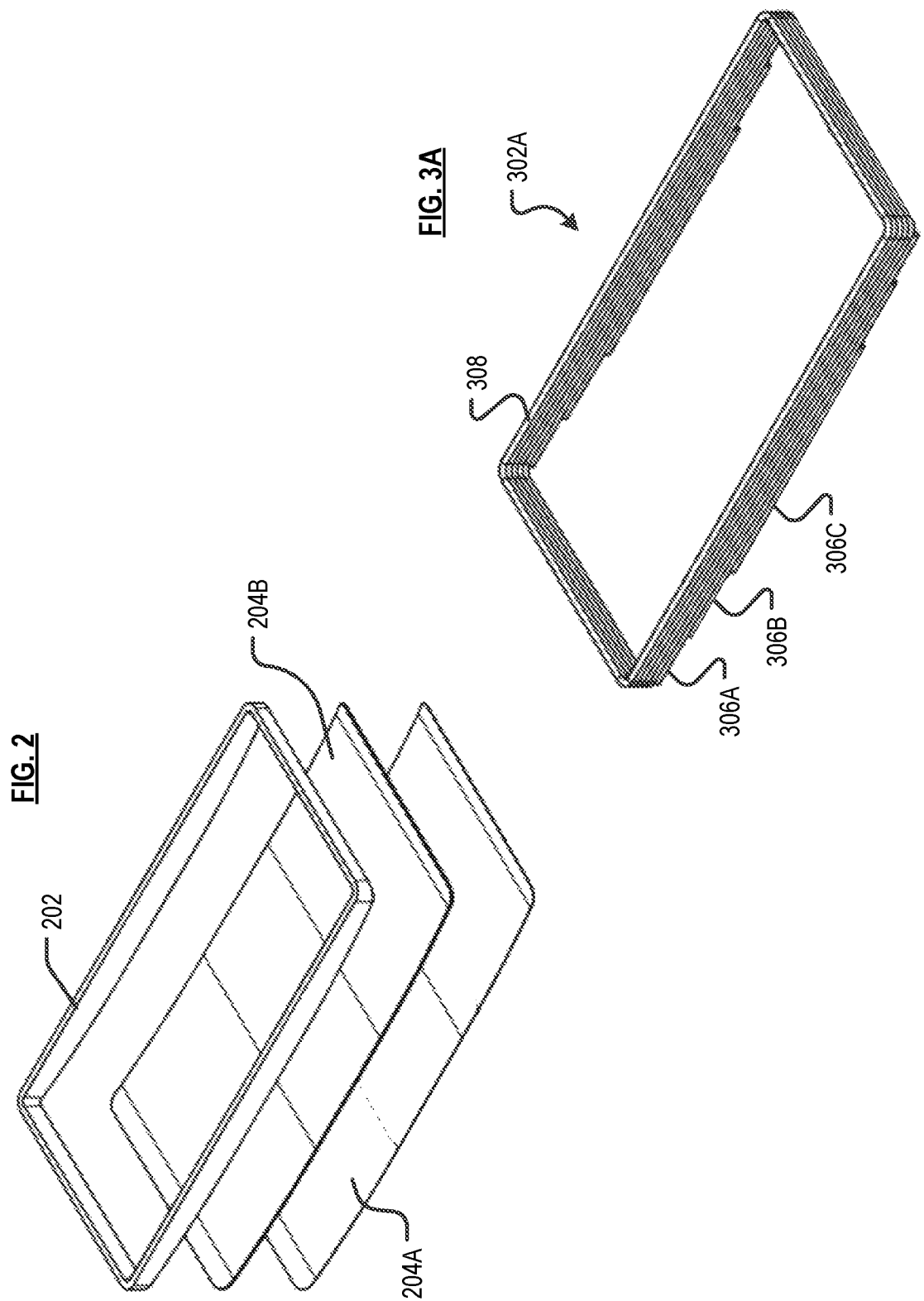

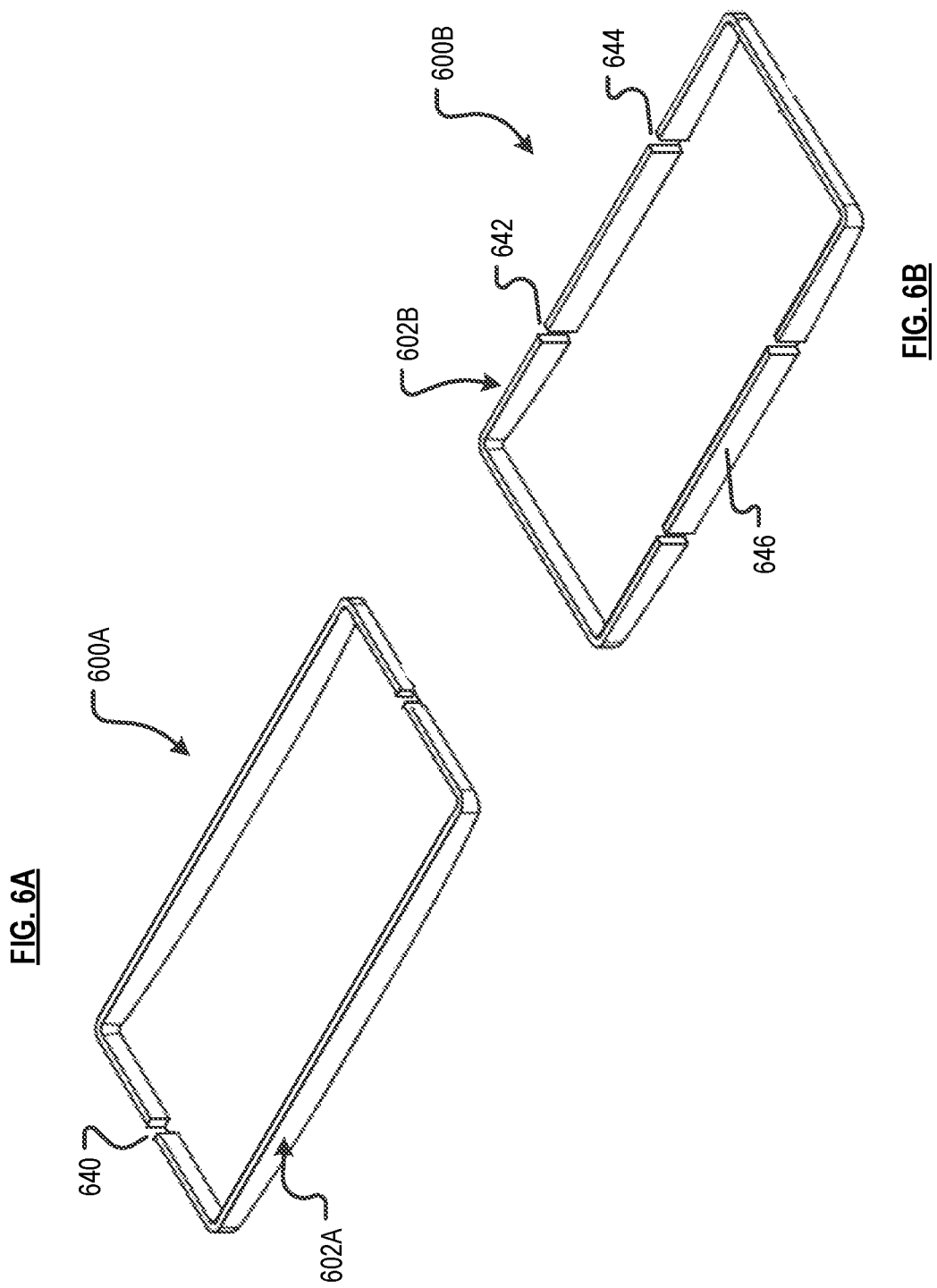

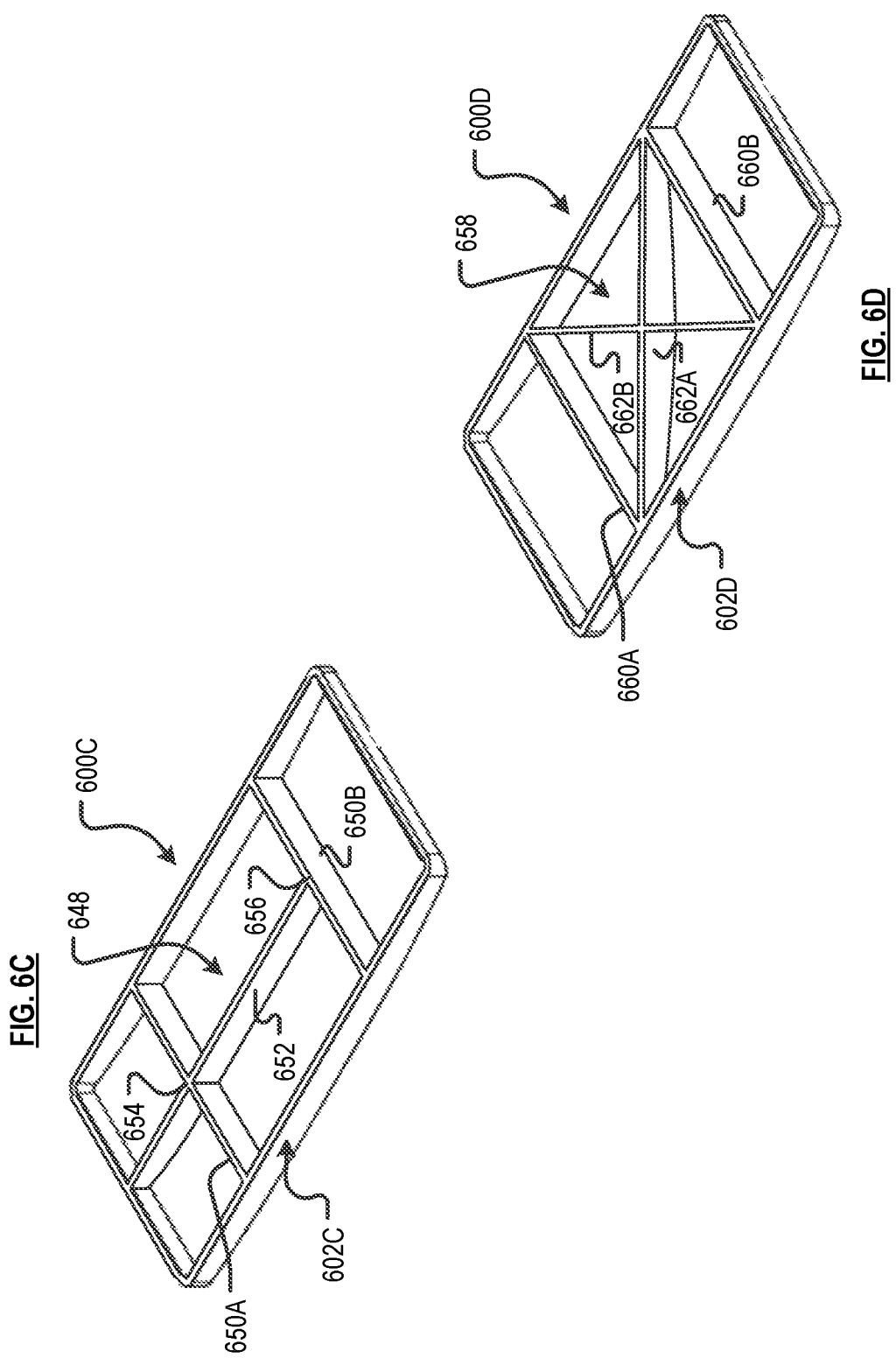

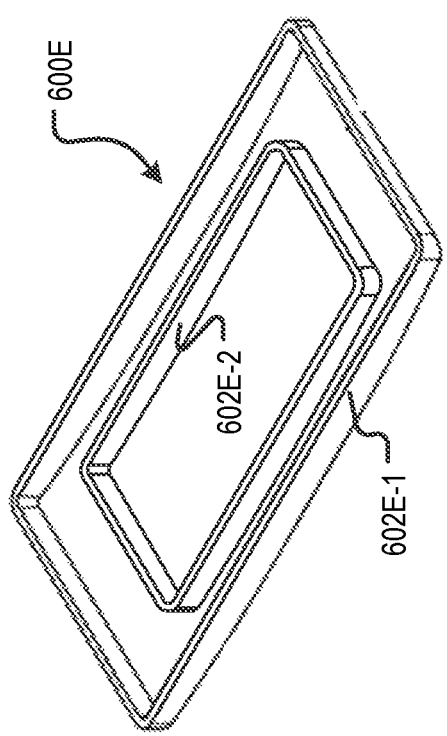

METHOD AND APPARATUS FOR COMPOSITE RIB AND RIB-AND-SHEET MOLDING

STATEMENT OF RELATED CASES

This case claims priority of U.S. Pat. App. Ser. No. 62/745,686 filed Oct. 15, 2018, which is incorporated by reference herein.

FIELD OF THE INVENTION

The present invention relates to fiber-composite parts, and more particularly, a way to create composite ribs and rib-and-sheet structure.

BACKGROUND

Some structural parts consist of a sheet supported on the front and/or backside with rib-like structures. Rib-and-sheet architectures have been fabricated using composite materials, which are strong, stiff, and light. In some instances the composite materials are used in combination with metals or other types of materials.

Composite rib-and-sheet structures are typically made from chopped prepreg in a two-step process. In particular, the rib(s) and sheet(s) are created separately and bonded together, such as with an adhesive.

SUMMARY

In accordance with the present teachings, rib-and-sheet structures include a rib comprising continuous, aligned fibers. The rib is fabricated via compression molding from continuous, aligned fiber, thereby providing an aligned, continuously reinforced rib. The present inventors recognized that rib-and-sheet structures that are made from continuous, aligned fibers, as opposed to chopped fibers, would result in improved material properties.

Rather than bonding the rib to the sheet as in the prior art, in embodiments of the invention, the aligned, continuous-fiber-reinforced rib is molded to the sheet(s) in a compression molding process. Molding, as opposed to adhering as in the prior art, also contributes to the superior material properties of rib-and-sheet structures fabricated in accordance with the present teachings.

In one embodiment in accordance with the invention, rib-and-sheet structures are produced in a two-step compression-molding process. The two-step process involves creating a near net-shape rib from fiber-bundle based preforms, and then molding the rib with either (i) a preformed sheet, (ii) plies that form a laminate/sheet during the molding process, or (iii) chopped fibers that form a sheet during the molding process.

In some embodiments, the rib is formed in a first mold and then moved to a second mold for forming the rib-and-sheet part. In some other embodiments, the rib is formed using the same mold that is used to form the final (rib-and-sheet) part.

In another embodiment, rib-and-sheet structures are fabricated in a one-step compression-molding process, wherein fiber-bundle-based preforms and (i) a preformed sheet, (ii) plies that form a laminate/sheet, or (iii) chopped fibers are combined in a mold and molded in a single step.

In the illustrative embodiment, the rib is a continuous structure in the form of a loop, which is located at the perimeter of a sheet. The rib comprises aligned, continuous fibers. However, the rib can have many other configurations. For example, in some embodiments, the rib is discontinuous/segmented (although the fibers in each segment are continuous and aligned). In some additional embodiments, the rib is supplemented with additional support members. In some further embodiments, the rib-and-sheet part comprises plural, concentrically arranged ribs. These are but a few non-limiting examples of other rib arrangements.

In addition to providing a final rib-and-sheet part with better mechanical properties than the prior art due to: (a) the structure of the rib, and (2) "molding" rather than "adhering," both the one-step and the two-step process save considerable time over the adhesive-based traditional processes.

In a first illustrative embodiment, the invention provides a method for molding, via compression molding, a rib-and-sheet part, comprising:

forming a plurality of continuous-fiber preforms, each preform consisting essentially of a segment of towpreg, the segment of towpreg comprising a bundle of fibers impregnated with a first polymer resin;

organizing the preforms into an assemblage thereof, the assemblage having a first shape, wherein the assemblage consists of multiple layers, each layer comprising at least one of the preforms, and wherein at least some of the layers have the first shape;

subjecting, in a first mold, the assemblage to heat that is sufficient to melt the first polymer resin, and pressure, thereby consolidating the assemblage;

subjecting, to heat and pressure, a first material selected from the group consisting of a preformed sheet of prepreg, plural plies of prepreg, and chopped fibers, wherein the heat and pressure is sufficient to consolidate the first material with consolidated assemblage; and cooling the consolidated first material and the consolidate assemblage, thereby forming a rib-and-sheet part.

In another embodiment, the invention provides a method for molding, via compression molding, a rib-and-sheet part, comprising:

placing constituents in a mold cavity, the constituents comprising:
  (i) a first material selected from the group consisting of a preformed sheet of prepreg, plural plies of prepreg, and chopped fibers; and
  (ii) a plurality of continuous-fiber preforms, each preform comprising a bundle of unidirectionally aligned fibers, wherein placing the continuous-fiber preforms in the mold cavity further comprises arranging the plurality of preforms into an assemblage thereof, the assemblage having a first shape;

consolidating the constituents by subjecting same to heat and pressure; and cooling the constituents, thereby forming a rib-and-sheet part.

In yet another embodiment, the invention provides a method for molding, via compression molding, a rib-and-sheet part, comprising:

placing constituents in a first mold cavity, the constituents comprising:
  (i) a first material selected from the group consisting of a preformed sheet of prepreg, plural plies of prepreg, and chopped fibers; and
  (ii) a rib consisting essentially of continuous fibers in a polymer matrix, wherein a major portion of the fibers are unidirectionally aligned, and wherein the rib has a first shape;

consolidating the constituents by subjecting same to heat and pressure; and cooling the constituents, thereby forming a rib-and-sheet part.

In a further embodiment, the invention provides a rib-and-sheet part, comprising:

a planar sheet portion, the sheet portion consisting essentially of a material selected from the group consisting of a preformed sheet of prepreg, plural plies of prepreg, and chopped fibers; and a rib portion, wherein at least a portion of the rib is disposed at a periphery of the planar sheet portion, wherein the rib portion consists essentially of continuous fibers in a polymer matrix.

Additional embodiments of the invention comprise any other non-conflicting combination of features recited in the above-disclosed embodiments and in the Detailed Description below.

BRIEF DESCRIPTION OF THE DRAWINGS

FIG. 2 depicts an exploded view of a rib-and-sheet part in accordance with a first illustrative embodiment, wherein the part is molded in a two-step process.

FIG. 3A depicts a first illustrative embodiment of a preform charge for making a rib-and-sheet part in accordance with the present teachings.

FIGS. 6A through 6E depict alternative embodiments of a rib in accordance with the present teachings.

DETAILED DESCRIPTION

Figure 1:
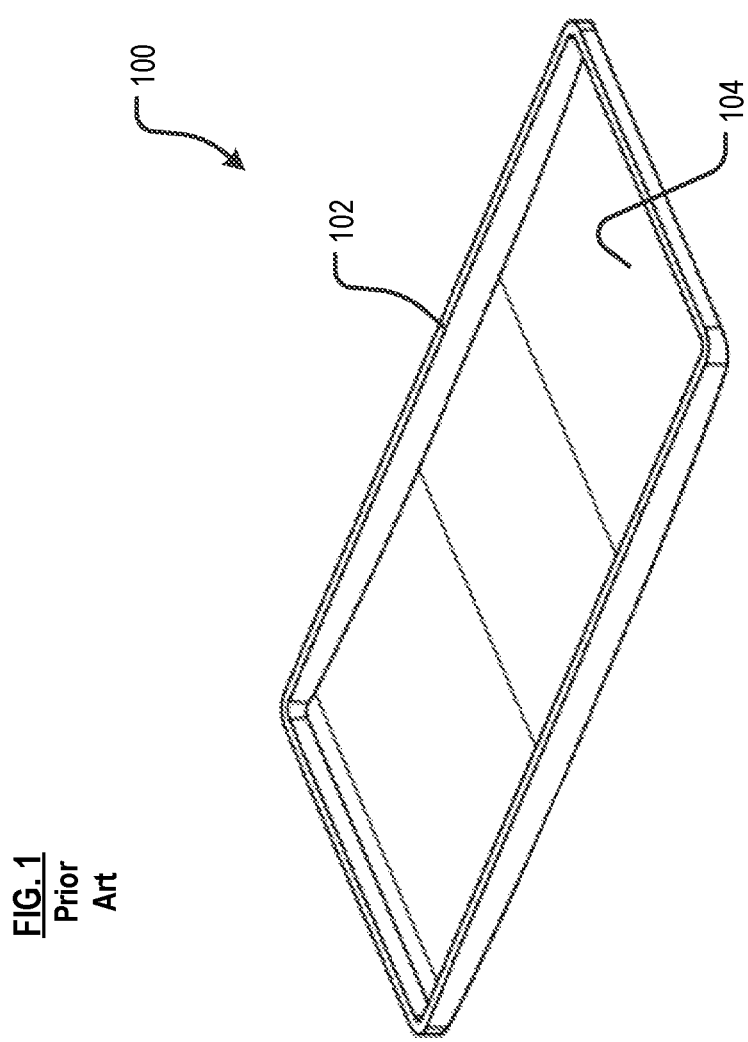
FIG. 1 depicts a rib-and-sheet part in the prior art.

The following terms, and their inflected forms, are defined for use in this disclosure and the appended claims as follows:

"Fiber" means an individual strand of material. A fiber has a length that is much greater than its diameter. For use herein, fibers are classified as (i) continuous or (ii) short. Continuous fibers have a length that is about equal to to the length of a major feature of a mold in which they are placed. And, similarly, continuous fibers have a length that is about equal to that of the part in which they will reside. Short fibers have a length that is shorter than the length of a major feature of the mold in which they are placed, and typically comparable to the length of minor features of the mold, plus some additional length to enable "overlap" with other fibers, such as continuous fibers. The term "short fiber," as used herein, is distinct from the "chopped fiber" or "cut fiber," as those terms are typically used in the art. In the context of the present disclosure, short fiber is present in a preform and, as such, will have a defined orientation in the preform, the mold, and the final part. As used generally in the art, chopped or cut fiber has a random orientation in a mold and the final part. Additionally, as used herein, the length of "short fiber" will be based on the length of the smaller features of a mold (they will be comparable in length). In contrast, the length of chopped or cut fiber typically bears no predefined relationship to the length of any feature of a mold/part.

"Compatible" means, when used to refer to two different resin materials, that the two resins will mix and bond with one another.

"Stiffness" means resistance to bending, as measured by Young's modulus.

"Tensile strength" means the maximum stress that a material can withstand while it is being stretched/pulled before "necking" or otherwise failing (in the case of brittle materials).

"Continuous" fiber or fiber bundles means fibers/bundles having a length that is about equal to the length of a major feature of a mold in which the fiber/bundles are placed.

"Tow" means a bundle of fibers, and those terms are used interchangeably herein unless otherwise specified. Tows are typically available with fibers numbering in the thousands: a 1K tow, 4K tow, 8K tow, etc.

"Prepreg" means fibers, in any form (e.g., tow, woven fabric, tape, etc.), which are impregnated with resin.

"Towpreg" or "Prepreg Tow" means a fiber bundle (i.e., a tow) that is impregnated with resin.

"Preform" means a sized, or sized and shaped portion of tow-preg, wherein the cross section of the fiber bundle has an aspect ratio (width:thickness) of between about 0.25 to about 6. The term "preform" explicitly excludes sized/shaped: (i) tape (which typically has an aspect ratio—cross section, as above—of between about 10 to about 30), (ii) sheets of fiber, and (iii) laminates.

"Rib-and-Sheet Part" includes a sheet and one or more ribs, wherein the ribs are in intimate contact with and substantially normal to the surface of the sheet. The sheet has a thickness dimension that is much smaller than its length and width dimensions, and the rib has a length dimension that is much greater than its width or height, and wherein the height of the rib is typically greater than or equal to its width.

"Planar" means having a two-dimensional characteristic. The term "planar" is explicitly intended to include a curved planar surface. For example, the "sheet" portion of the rib-and-sheet part can be curved or flat.

"About" or "Substantially" means +/−20% with respect to a stated figure or nominal value.

Other than in the examples, or where otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−20%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

The fiber bundles that are sized or sized and shaped to form preforms for use herein includes thousands of individual fibers, typically in multiples of a thousand (e.g., 1 k, 10 k, 24 k, etc.). Such fiber bundles are typically called "tow." In some embodiments, the fibers in the tow are impregnated with a polymer resin; such material is referred to as "towpreg" or "prepreg tow." Although all of the towpreg depicted in the Figures are cylindrical (i.e., have a circular cross section), they can have any suitable cross-sectional shape (e.g., oval, trilobal, polygonal, etc.).

The individual fibers can have any diameter, which is typically, but not necessarily, in a range of 1 to 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing. Furthermore, carbon nanotubes can be used.

Suitable resin includes any thermoplastic, thermoset, or metal matrix that bonds to itself under heat and/or pressure, although in most embodiments, a thermoplastic is used.

Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC). An exemplary thermoset is epoxy.

FIG. 1 depicts conventional rib-and-sheet part 100 with continuous rib 102 around the perimeter of curved (not flat) sheet 104. In the prior art, this rib-and-sheet part part is fabricated from chopped prepreg. In some prior-art methods, the rib and sheet are formed in separate molding steps, and then glued together with an adhesive to form the rib-and-sheet part. Prior-art rib-and-sheet parts can also be fabricated via compression molding in one step, again using randomly oriented chopped fiber, and with performance typical thereof.

In accordance with the present teachings, a rib-and-sheet part, which looks identical to rib-and-sheet part 100, is formed using a continuous-fiber-reinforced rib. The part can be molded using either a one or two-step process. As compared to the prior art, rib-and-sheet parts made in accordance with the present teachings have much higher strength and stiffness since the rib is made from aligned, continuous fibers, as opposed to chopped fiber. Furthermore, to the extent prior-art rib-and-sheet parts are made by adhering, rather than molding the rib and the sheet, they will exhibit relatively inferior properties relative to the fully molded part.

Two-Step Process.

In accordance with the first step of the two-step compression-molding process, the rib is formed. As formed, the rib will have a shape that will be very close to its final ("near-net") shape in the finished part. In the second operation, the pre-formed rib and a planar (curved or flat) preformed sheet, or two or more planar (curved or flat) plies (which will form a laminate sheet), or chopped fiber prepreg are placed in a mold and molded to form the rib-and-sheet part.

A. Sheet.

FIG. 2 depicts the constituents that are placed in the mold in accordance with an embodiment of the second step of the process. In particular, preformed rib 202 and plies 204A and 204B are added to the mold cavity. Rib 202 is formed, for example and without limitation, using mold 515 depicted in FIG. 5A and described in further detail later herein. Mold 521, depicted in FIG. 5B and described in further detail later herein, can be used to form the final part by molding, at the same time, rib 202 with plies 204A and 204B. As previously mentioned, in some other embodiments, a preformed sheet or chopped-fiber prepreg can be placed in the mold cavity rather than plies.

In some embodiments, both plies 204A and 204B consist of a composite prepreg material, such as tape or fabric, which includes thermoplastic resin. In such embodiments, the thermoplastic resin used in the two plies is the same, or, if different, the resins must be compatible with one another. Also, plies 204A and 204B can contain different types of fiber, can have a different overall fiber-volume fraction, and/or can contain fibers of different length. Each ply has a thickness that is typically less than about 0.25 millimeters. In some other embodiments, more than two plies are used to form the "sheet" portion of the rib-and-sheet part.

In some embodiments, the fibers in one of the two plies will have its fibers aligned in a different direction(s) than the fibers in the other of the two plies. As compared to a laminate having plies in which the fibers in all plies are oriented in the same direction along a single axis, a laminate having plies with different fiber orientations provides improved properties in such different orientations.

More particularly, as will be appreciated by those skilled in the art, fiber is strong in tension along its length. If tape is used as the plies (tape has its fibers oriented in a single direction), and both plies have their fibers oriented in the same direction, then the laminate formed therefrom will be strong in tension in only the one direction in which the fibers are oriented. If, on the other hand, the fibers in the two tape-based plies are oriented orthogonally with respect to one another, then the laminate formed from those two plies will be strong in the two orthogonal directions. If the fibers in one of the tape-based plies are oriented +45° and the fibers in the other of the tape-based plies are oriented −45° (with respect to the long axis of the laminate to be formed), then the laminate will have an enhanced ability to resist shear stress (torsion). If a woven mat is used as the plies, then each ply is strong is two orthogonal directions. If one of the plies is rotated 45° with respect to the other ply, then the resulting laminate will be strong in tension in four directions (e.g., 0°, 90°, −45°, and +45°, etc.).

In some embodiments, both of plies 204A and 204B include chopped fiber (i.e., defined as either or both of chopped fiber or chopped prepreg), as well as continuous fiber. In some embodiments, one of the plies includes only chopped fiber. In some further embodiments, both of the plies include only chopped fiber. And in yet some additional embodiments, one or both of the plies include only continuous fiber.

In some further embodiments, one or both of plies 204A and 204B consists of a material other than a composite, wherein that material can be co-molded with the composite rib. Examples of such a material include, without limitation, plastic, steel, or aluminum. In embodiments in which one or both of the plies is metal, the bonding surface thereof is preferably textured to improve the bond. Typical texturing techniques include anodizing or mechanical methods.

In FIG. 2, plies 204A and 204B are depicted as being curved. In some other embodiments, the plies are (or preformed sheet is) flat, and formed into the curved shape during the molding (second) step. Although plies 204A and 204B are depicted as being curved about one axis (i.e., the lateral midpoint of the ply), plies can be curved about more than one axis.

As previously mentioned, in the two-step process, the rib is formed in a first mold (e.g., mold 515 of FIG. 5A) and the final rib-and-sheet part is formed in a second mold. FIG. 5B depicts mold 521 suitable for forming the final rib-and-sheet part.

With reference to FIG. 5B, the material that will form the "sheet" portion of the final rib-and-sheet part is first placed in mold cavity 522, resting on bottom surface 524. In various embodiments, that material is either: (i) plies 204A and 204B, (ii) a preformed laminate sheet (not depicted), or (iii) chopped fiber (not depicted) that is evenly dispersed on the bottom surface 524 of mold cavity 522.

Rib 202 is then placed in mold cavity 522. The rib is dimensioned and arranged so that when placed in the mold cavity, it abuts inner wall 526. As male mold portion 528 is coupled to the mold cavity 522, the curved bottom surface 532 presses against the material that forms the "sheet" portion. Rib 202 is sandwiched between inner wall 526 of mold cavity 522 and wall 530 of male mold portion 528. The mold is then subjected to heat suitable for melting the resin within rib 202 and the resin within the material that will form the sheet portion. The contents of the mold are thus consolidated by virtue of the heat and pressure. After an appropriate amount of time at heat and pressure, mold 521 and its contents are cooled, and the rib-and-sheet part is removed.

B. Rib.

Returning to the discussion of rib 202, such a rib is formed from continuous-fiber preforms. These preforms are formed using a sizing/bending machine. The formation of a preform involves appropriately bending towpreg, typically via a robot or other appropriate mechanism, then cutting the bent portion of towpreg to a desired length. As appropriate, the order of the bending and cutting can be reversed. These preforms are the constituents that are molded to form rib 202.

The preforms that are used to form rib 202 can differ from one another. For example, there can be preform-to-preform differences in the fiber and/or resin of the fiber bundles that compose the preforms, although it is generally preferred to use the same resin in all of the preforms. To the extent different resins are used, they must be compatible. Also, there can be preform-to-preform differences in size and shape, as discussed later in conjunction with the description of FIGS. 3A and 3B.

Figure 5A:
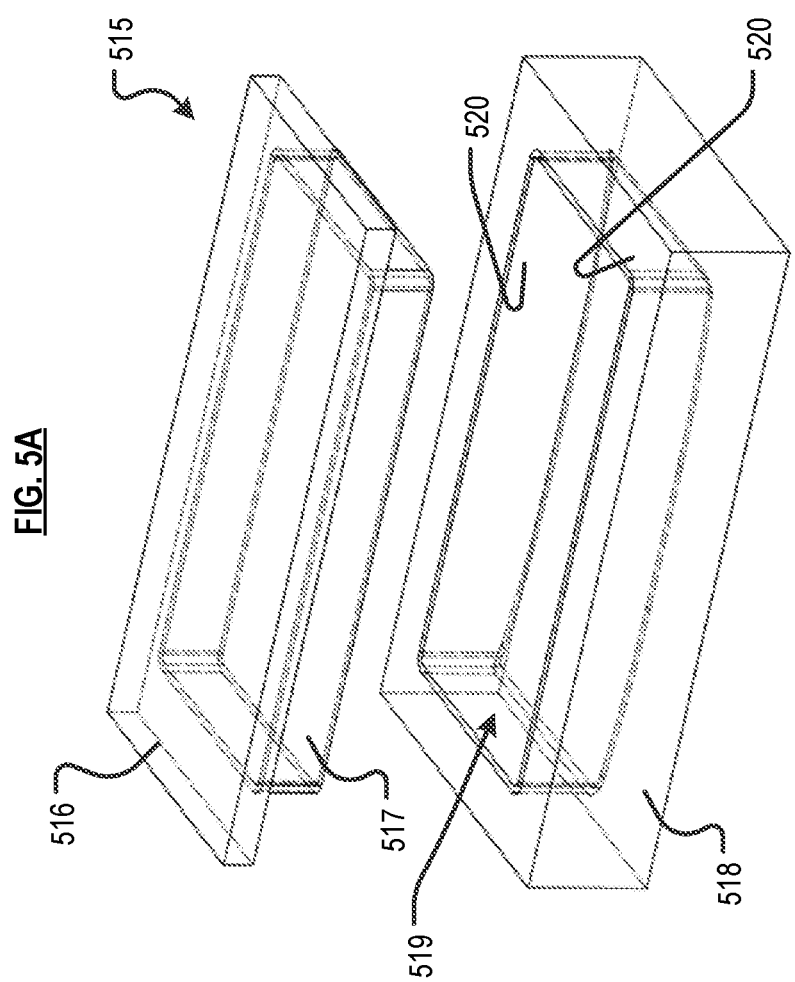
FIG. 5A depicts a mold for molding a rib for use in conjunction with embodiments of the present invention.
Figure 5B:
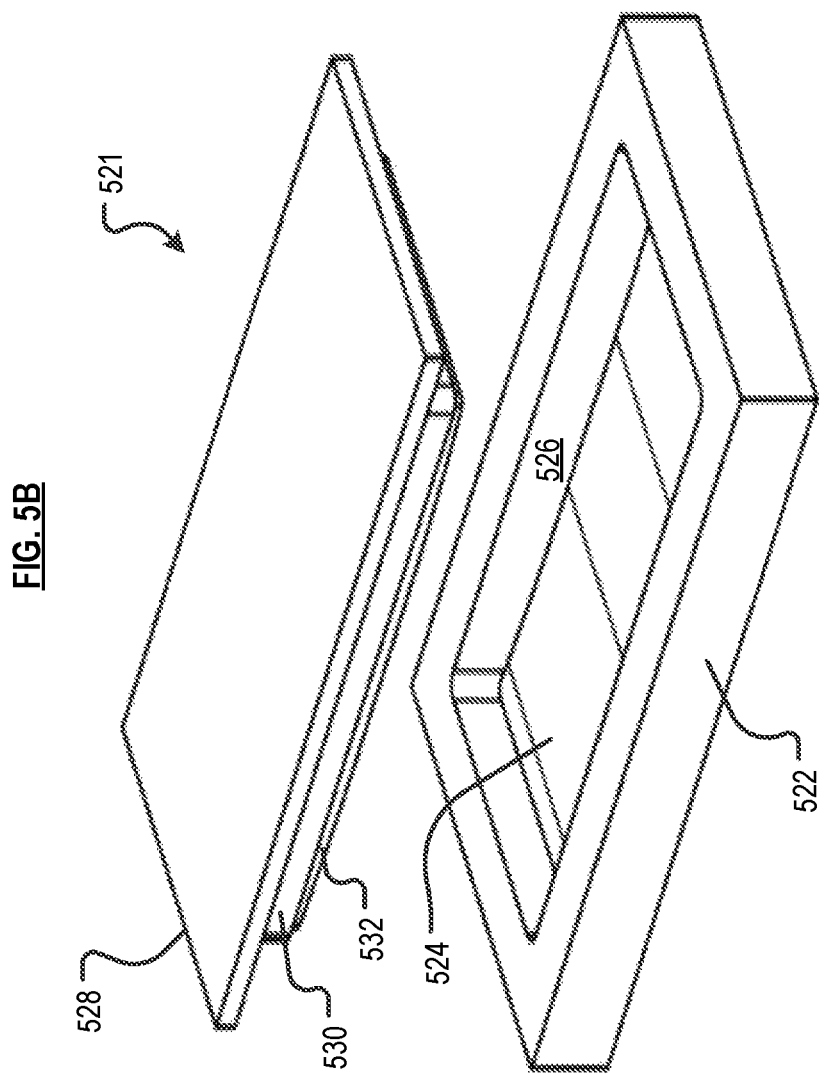
FIG. 5B depicts a mold for molding a rib-and-sheet part in accordance with the illustrative embodiment of the present invention.

The preforms that used to form rib 202 are then placed in a mold suitable therefor, such as mold 515 of FIG. 5A. The preforms are stacked in an appropriate arrangement (see discussion of FIGS. 3A and 3B, below) along wall 520 of mold cavity 518. As male mold portion 516 is coupled to the mold cavity 518, the assemblage of preforms is sandwiched between inner wall 520 of mold cavity 518 and wall 517 of male mold portion 516. Pressure is applied by closing the mold.

Mold 515 is then subjected to heat suitable for melting the resin within the preforms. The materials composing the preforms are thus consolidated by virtue of the heat and pressure. After an appropriate amount of time at heat and pressure, mold 515 and its contents are cooled, and rib As male mold portion 528 is coupled to the mold cavity 522, the curved bottom surface 532 presses against the material that forms the "sheet" portion. Rib 202 is sandwiched between inner wall 526 of mold cavity 522 and wall 530 of male mold portion 528. The mold is then subjected to heat suitable for melting the resin within rib 202 and the resin within the material that will form the sheet portion. The contents of the mold are thus consolidated by virtue of the heat and pressure. After an appropriate amount of time at heat and pressure, mold 515 and its contents are cooled, and rib 202 is removed.

In some embodiments, the preforms that are used to form rib 202 can be tacked/joined together into a single "preform charge." When tacked together, the individual preforms are far less likely to shift position with respect to one another, relative to loosely stacked preforms, and will therefore necessarily maintain their orientation with respect to each other. Also, by virtue of its overall geometry, the preform charge tends to register itself (i.e., establish and maintain an appropriate position) within the mold. This is advantageous since neither orientation nor position is verifiable once a mold is closed. Moreover, in embodiments in which the preform charge is formed using a fixture that is separate from the mold, it is relatively easy to then remove the preform charge the fixture and move it to the mold (typically robotically), as compared to individually adding a plurality of preforms to the mold and then arranging them therein.

In some embodiments, the preforms are tacked together by heating them until they soften, and then pressing them together. Heating is required if the resin is a thermoplastic; thermosets are tacky and typically do not require such heating and softening. The temperature at which a thermoplastic preform will soften is greater than or equal to the heat-deflection temperature of the particular thermoplastic used. Any of a variety of heating techniques can be used, including, for example and without limitation, hot air, heat lamps, ultrasonic welding, friction welding, lasers, chemical adhesives, mechanical methods such as lashing, etc. Once softened, the weight of the each overlying preform typically provides enough pressure to tack adjacent preforms to one another, once heating stops and the material is cooled.

Figure 3B:
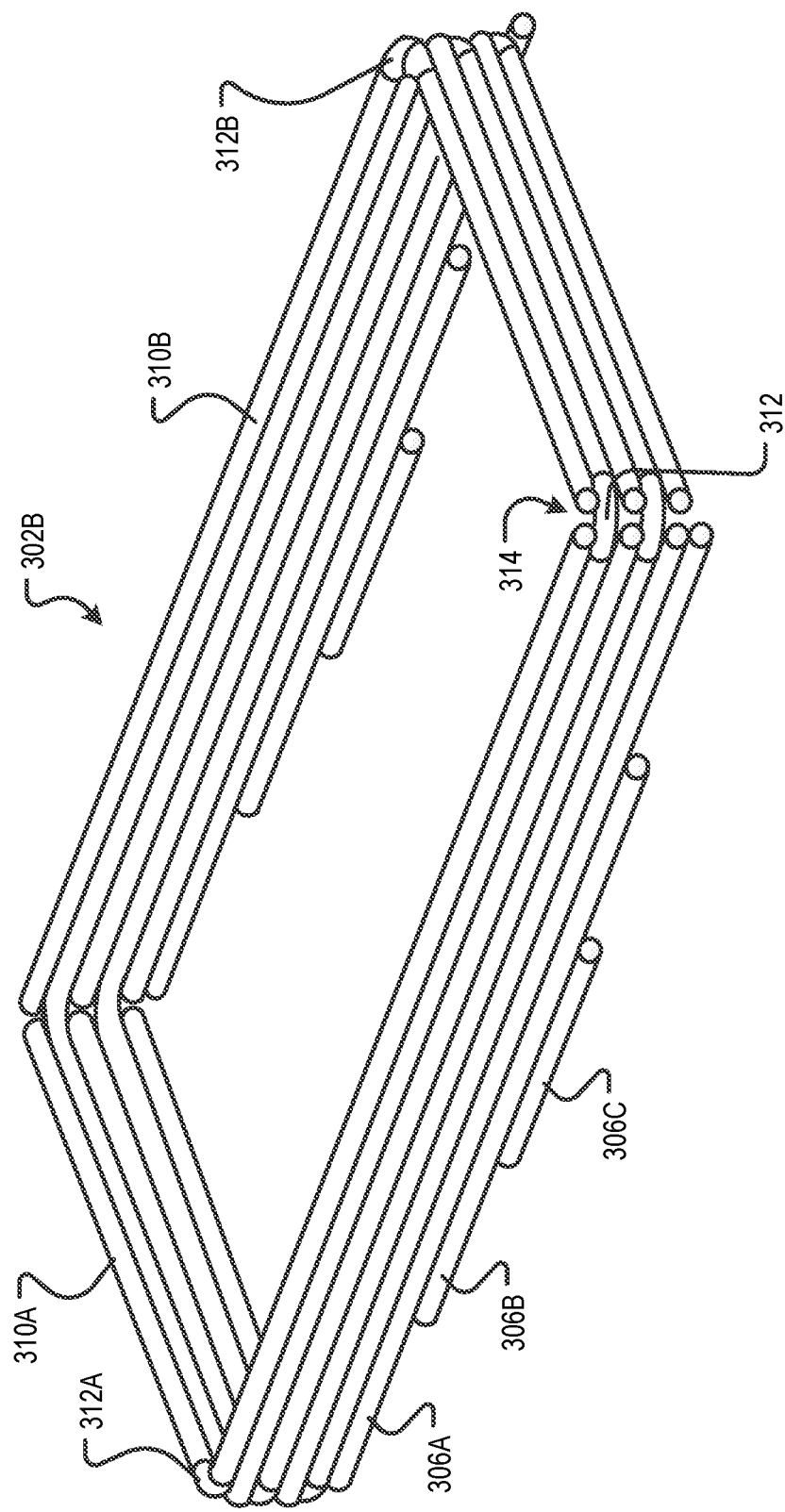
FIG. 3B depicts a second illustrative embodiment of a preform charge for making a rib-and-sheet part in accordance with the present teachings.

FIG. 3A depicts preform charge 302A and FIG. 3B depicts preform charge 302B, which represent two exemplary assemblages of preforms suitable for forming rib 202.

Preform charge 302A includes, in this embodiment, five continuous-fiber preforms 308 that are formed into the shape of rectangular loops (i.e., the final shape of the rib), as well as six preforms that are linear, including two each of preforms 306A, 306B, and 306C. The linear preforms are responsible for the curved form of rib 202, and are included to fill out the curvature of the sheet in the final molded rib-and-sheet part.

Preforms 308 that are shaped as loops contain at least one "start" and one "end." That is, since each preform 308 is a bent segment of towpreg, what were formerly the two ends thereof remain "unconnected," but are in close proximity to each other (not depicted in FIG. 3A). This discontinuity in each "layer" of the preform charge is advantageously staggered such that the discontinuities in adjacent underlying and overlying layers do not align. Such staggering results in relatively better final-part material properties, as compared to an arrangement in which the discontinuities are not staggered.

In some embodiments, such as in preform charge 302B depicted in FIG. 3B, each loop contains two individual preforms. More particularly, each loop is composed of two "L-shape" preforms: L-shaped preform 310A, having bend 312A, and L-shaped preform 310B, having bend 312B. Each loop has two gaps 314, which are the spaces between the two ends of the two preforms. Like preform charge 302A, preform charge 302B includes six linear preforms, including two each of preforms 306A, 306B, and 306C.

As mentioned in conjunction with the discussion of preform charge 302A, the discontinuities in each layer should be staggered, so that for each successive layer in the preform charge, gaps 314 are offset. In other words, if in any given "layer" of the preform charge, gap 314 is positioned at "corner 1" and "corner 3" of the loop, then the gap in the underlying and overlying layers will be positioned at "corner 2" and "corner 4." This enhances the strength of the preform charge as well as the molded part.

Preform charges 302A and 302B are examples of two assemblages for forming rib 202. It will be appreciated that preforms having shapes other than those depicted in preform charge 302A or 302B can be used to form rib 202 in accordance with the two-step process. For example, to create each rectangular layer, one "U-shaped" preform can be used in conjunction with one linear preform. The "U-shaped" preform could have two long sides and one short side, or two short sides and one long side. In some further embodiments, more than two preforms are used to create a loop shape.

In some other embodiments, any gap(s) in each loop-shaped layer is closed before placing the loop in a fixture or mold for forming a preform charge. Moreover, the manner in which the loop shape is formed can be varied from layer to layer, if desired. For example, one layer might be formed in the manner of preform charge 302A and an adjacent layer might be formed in the manner of preform charge 302B.

As an alternative to forming a preform charge, preforms can simply be loosely stacked, as appropriate, so that when consolidated by heat and pressure, rib 202 is formed.

One-Step Process.

Figure 4:
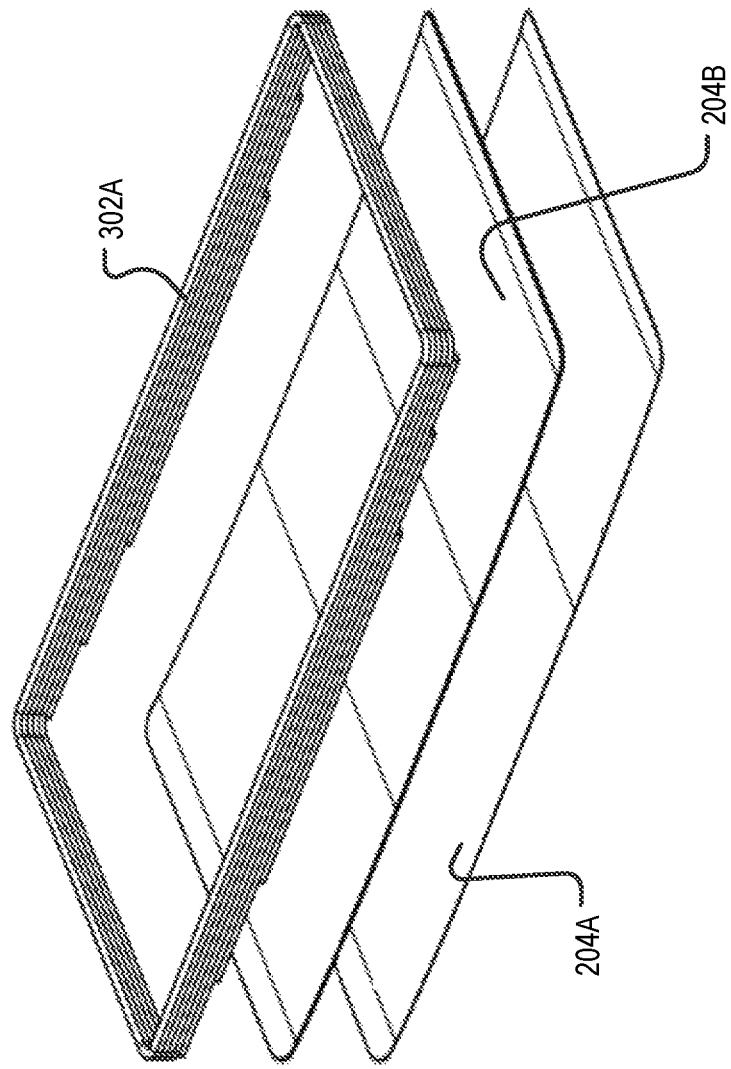
FIG. 4 depicts the constituents of a rib-and-sheet part that is made in accordance with a second illustrative embodiment, wherein the part is molded via a one-step process.

FIG. 4 depicts the constituents of single-step molding process. The one-step method is similar to the two-step method. However, rather than forming the rib in a first molding operation, the fabrication of the rib and fabrication of the sheet (to the extent the sheet is not preformed) is conducted at the same time in a single mold and in a single molding step. The cavity of the female mold must therefore be deep enough to accept all of the preforms. The male mold is shaped to form all surfaces of the final part in a single step.

As previously discussed, in some embodiments, plies 204A and 204B (tape or woven fabric) are cut to size and placed in the mold cavity. In some other embodiments, a preformed sheet is placed in the mold cavity. In yet some further embodiments, chopped fiber (for forming the sheet) is evenly dispersed in the mold cavity.

In some embodiments, a preform charge is formed, such as preform charge 302A or 302B. It can be formed in a separate fixture and then added to the mold, or it can be formed in the mold. Alternatively, preforms can be simply be positioned on top of one another in the appropriate geometry, without tacking them together to form a preform charge.

Once all constituents are in the mold cavity, the male mold is joined, and the molding operation commences, wherein heat and pressure consolidate the discrete materials into the final part. Mold 521 (FIG. 5B), which was used for the two-step process, can also be used for the one-step process. Of course, the mold must be tailored to the actual specifics of the rib-and-sheet part being formed.

Although the single-step process has efficiency advantages, the two-step process may well be preferable in situations in which it is difficult to maintain fiber alignment in the single-step process.

In the illustrative embodiment, a "rib," such as rib 202, is depicted as being a continuous loop at the perimeter of a sheet. Other geometries are, however, presently contemplated, and will occur to those skilled in the art in light of the present disclosure. A few of such alternative geometries are depicted in FIGS. 6A through 6E.

In some embodiments, such as depicted in FIGS. 6A and 6B, the rib is discontinuous or segmented. By way of example, in rib-and-sheet part 600A of FIG. 6A, rib 602A has two breaks in continuity, wherein gap 640 is located on each of the two short sides of the rib. This provides some flexibility to the short sides of the rib, and/or permits the passage of wires or the like across the rib.

In rib-and-sheet part 600B of FIG. 6B, rib 602B has four breaks in continuity, wherein gap 642 and gap 644 are located on each of the two long sides of the rib. This enables or one more predefined regions of rib 602B to be rendered relatively flexible. For example, the section of the rib between gaps 642 and 644 will be substantially more flexible than the other portions of rib 602B. It is notable that within each segment of rib 602B, the fiber are continuous (equal to the length of the segment) and aligned with one another.

The gaps in rib 602A and 602B can be formed as a part of the molding process, and can be formed using either the one-step or the two-step method. However, as the number of continuity breaks increases, it becomes increasingly more labor-intensive to use the two-step method; rather, the one-step method is preferentially used.

FIG. 6C depicts rib-and-sheet part 600C, wherein the strength of the rib is enhanced through the use of "internal" intersecting members that brace an "outer" loop. Specifically, brace 648 comprises members 650A, 650B, and 652. This brace shows a characteristic "cross" intersection 654 as well as a "T" intersection 656. Applying the two-step process, loop portion and brace 648 of rib 602C can be formed in a one step, and then molded with the sheet/plies/chopped fiber in a second step. Alternatively, rib 602C itself can be formed in two steps, wherein the loop portion and brace 648 are formed independently of one another, and then separately added to another mold to be molded with the sheet/plies/chopped fiber to form the final part.

In a yet further embodiment, rib 602C is formed in three steps, wherein the loop portion and brace 648 are separately molded, and then the loop and brace 648 are molded together to form the rib. Alternatively, rib-and-sheet part 600C can be formed via the one-step method, with a relatively complex mold.

It is notable that in this embodiment, the two-step method may produce parts having better properties than the one-step method. The potential for such improved properties arises because some of the preforms that are used to form brace 648—such as those forming members 650A, 650B, and one end of member 652—can be arranged so that they overlap with preforms that form the loop portion, such that the fibers will overlap in the final part. Since, however, there is likely to be some loss of fiber alignment when using the one-step method, which can be avoided, for example, when molding only the rib/braces in a first step, and then molding the complete rib-and-sheet part in the second step.

FIG. 6D depicts rib-and-sheet part 600D, wherein a "truss" 658 is formed within the loop portion of rib 620D. The truss comprises members 660A and 660B which are aligned parallel to the short sides of the loop and support the long sides thereof, and crossing members 662A and 662B. The truss configuration is, of course, well-known for its ability to create a very rigid structure.

FIG. 6E depicts rib-and-sheet part 600E, wherein multiple ribs—in this example two ribs, 602E-1 and 602E-2—are arranged in concentric or nested fashion. This arrangement is advantageous, for example, for isolating certain components that are arrangement on the sheet portion of the part. For example, inner rib 602E-2 contains metal, it can function as a Faraday cage to shield the components on either of the inner rib from electromagnetic fields emanating from components on the other side of the rib.

It is to be understood that the disclosure describes a few embodiments and that many variations of the invention can easily be devised by those skilled in the art after reading this disclosure and that the scope of the present invention is to be determined by the following claims.

What is claimed:

1. A method for molding, via compression molding, a rib-and-sheet part, the method comprising:
    forming a plurality of continuous-fiber preforms, each preform comprising a bundle of unidirectionally aligned fibers impregnated with a first thermoplastic polymer resin;
    organizing the preforms into an assemblage thereof, the assemblage having a first shape, wherein the assemblage consists of multiple layers, each layer comprising at least one of the preforms, and wherein at least some of the layers have the first shape;
    compression molding, in a first mold, the assemblage, thereby subjecting it to heat that is sufficient to melt the first thermoplastic polymer resin and pressure that is sufficient to fully consolidate the assemblage of preforms into a rib having the first shape;
    compression molding, in the first mold or in a second mold, a first material selected from the group consisting of a preformed sheet of prepreg, plural plies of prepreg, and chopped fibers, wherein heat and pressure applied via the compression molding is sufficient to consolidate the first material with the consolidated assemblage; and
    cooling the consolidated first material and rib, thereby forming a rib-and-sheet part.

2. The method of claim 1 wherein the first shape comprises a loop, and wherein the loop comprises the unidirectionally aligned fibers.

3. The method of claim 1 wherein the first shape comprises a perimeter portion and an internal portion, the perimeter portion defining a loop, and the internal portion comprising one or more members disposed within the perimeter portion and that intersect the perimeter portion.

4. The method of claim 2 wherein the rib is discontinuous.

5. The method of claim 1 wherein at least some of the layers having the first shape have a gap therein, and when the layers having the gap are directly adjacent one another in overlying relation, organizing the preforms further comprises offsetting the gaps in the adjacent layers.

6. The method of claim 4 wherein for at least some of the layers having the first shape, the loop shape is formed from two "L"-shaped preforms.

7. The method of claim 1 and further comprising tacking together the assemblage of preforms, thereby forming a preform charge having the first shape.

8. The method of claim 1 wherein organizing the preforms into an assemblage further comprises:
    organizing the preforms into an assemblage in a fixture physically adapted to organize them into the first shape;
    tacking together the assemblage of preforms, thereby forming a preform charge having the first shape; and
    removing the preform charge from the fixture and placing it in the first mold.

9. The method of claim 1 wherein compression molding, the assemblage in the first mold comprises:
    cooling the consolidated assemblage, thereby forming the rib; and
    placing the rib in the second mold.

10. The method of claim 9 wherein the second mold is configured to dispose at least a portion of the rib at a perimeter of the rib-and-sheet part.

11. The method of claim 1 wherein the first material and the assemblage are subjected to the heat and the pressure of compression molding in the first mold, and at the same time.

12. A method for molding, via compression molding, a rib-and-sheet part, the method comprising:
    placing constituents in a mold cavity, the constituents comprising:
        (i) a first material selected from the group consisting of a preformed sheet of prepreg, plural plies of prepreg, and chopped fibers; and
        (ii) a plurality of continuous-fiber preforms, each preform comprising a bundle of unidirectionally aligned fibers impregnated with thermoplastic polymer resin, wherein placing the continuous-fiber preforms in the mold cavity further comprises arranging the plurality of preforms into an assemblage thereof, the assemblage having a first shape;
    consolidating the constituents by compression molding the constituents; and
    cooling the constituents, thereby forming a rib-and-sheet part, the rib containing the continuous, unidirectionally aligned fibers.

13. The method of claim 12 and further comprising tacking together the assemblage of preforms, thereby forming a preform charge having the first shape.

14. The method of claim 12 wherein the first shape comprises a loop.

15. The method of claim 12 wherein the first shape comprises a perimeter portion and an internal portion, the perimeter portion defining a loop, and the internal portion comprising one or more members disposed within the perimeter portion and that intersect the perimeter portion.

16. The method of claim 12 wherein the rib is discontinuous.

17. The method of claim 12 wherein the assemblage consists of multiple layers, each layer comprising at least one of the preforms, and wherein at least some of the layers have the first shape, and wherein at least some of the layers having the first shape have a gap therein, and when the layers having the gap are directly adjacent one another in overlying relation, arranging the preforms further comprises offsetting the gaps in the adjacent layers.

18. A method for molding, via compression molding, a rib-and-sheet part, the method comprising:
    placing, in a first mold cavity, a preform charge having a first shape, the preform charge comprising an assemblage of a plurality of continuous-fiber preforms that are adhered to one another, each preform comprising a bundle of unidirectionally aligned fibers and thermoplastic polymer resin;

consolidating, by compression molding subjecting the preform charge in the first mold cavity, thereby forming a rib having the first shape;

compression molding, in the first mold cavity or in a second mold cavity, a first material selected from the group consisting of a preformed sheet of prepreg, plural plies of prepreg, and chopped fibers, in the presence of the rib, thereby consolidating the first material with the rib; and cooling the consolidated first material and the rib, thereby forming a rib-and-sheet part, wherein the rib and the sheet are not coplanar.

19. The method of claim 18 wherein the first shape is a loop.

20. The method of claim 19 wherein the loop is discontinuous.

21. The method of claim 19 wherein the first shape comprises a perimeter portion and an internal portion, the perimeter portion defining a loop, and the internal portion comprising one or more members disposed within the perimeter portion and that intersect the perimeter portion.

* * * * *